United States Patent
Schoen (10) Patent No.: US 11,289,996 B2
(45) Date of Patent: Mar. 29, 2022

(54) CONVERTER ASSEMBLY WITH AN ABILITY TO DISCONNECT A FAULT CURRENT AND A METHOD FOR DISCONNECTING A FAULT CURRENT AT A CONVERTER ASSEMBLY OF THIS TYPE

(71) Applicant: SIEMENS AKTIENGESELLSCHAFT, Munich (DE)

(72) Inventor: Andre Schoen, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/635,658

(22) PCT Filed: Jul. 31, 2017

(86) PCT No.: PCT/EP2017/069268
§ 371 (c)(1),
(2) Date: Jan. 31, 2020

(87) PCT Pub. No.: WO2019/024972
PCT Pub. Date: Feb. 7, 2019

(65) Prior Publication Data
US 2021/0126555 A1    Apr. 29, 2021

(51) Int. Cl.
*H02M 1/32* (2007.01)
*H02J 3/36* (2006.01)
(Continued)

(52) U.S. Cl.
CPC ............. *H02M 1/32* (2013.01); *H02J 3/36* (2013.01); *H02M 7/217* (2013.01); *H02M 7/483* (2013.01);
(Continued)

(58) Field of Classification Search
CPC ............................ H02M 1/32; H02M 7/217
See application file for complete search history.

(56) References Cited

U.S. PATENT DOCUMENTS 8,570,779 B2 * 10/2013 Dommaschk ........... H02M 1/32
363/53
9,484,835 B2    11/2016 Norrga
(Continued)

FOREIGN PATENT DOCUMENTS

EP         2856590 B1     9/2016
WO    WO 2012103936 A1   8/2012
(Continued)

*Primary Examiner* — Rafael O De Leon Domenech
(74) *Attorney, Agent, or Firm* — Laurence A. Greenberg; Werner H. Stemer; Ralph E. Locher (57) ABSTRACT

A converter assembly has multi-phase multi-stage converters which are connected to parallel-connected transformers. The converter assembly contains series-connected partial converters, each having three parallel-connected bipolar phase modules, which are formed of two series-connected converter modules. The connection points of the converter modules form the phase connections for the transformers. The phase modules of a first partial converter consist only of unipolar sub-modules and those of a second partial converter consists only of bipolar sub-modules. A controller respectively reduces at least the partial DC voltage of the second partial converter, wherein the partial DC voltage thereof can be inverted at least until compensating the partial DC voltage of the first partial converter if the direct current exceeds a target value.

8 Claims, 9 Drawing Sheets

(51) Int. Cl.
  *H02M 7/483* (2007.01)
  *H02M 7/5387* (2007.01)
  *H02M 7/217* (2006.01)

(52) U.S. Cl.
  CPC ........ *H02M 7/53873* (2013.01); *H02M 1/325* (2021.05); *H02M 7/4835* (2021.05)

(56) References Cited

U.S. PATENT DOCUMENTS

| | | | |
|---|---|---|---|
| 9,608,436 B2 | 3/2017 | Barker | |
| 2013/0148392 A1* | 6/2013 | Inoue | H02M 7/10 363/68 |
| 2013/0308235 A1 | 11/2013 | Davies et al. | |
| 2015/0102671 A1* | 4/2015 | Rivera | H02M 7/06 307/31 |
| 2015/0333652 A1* | 11/2015 | Choi | H02M 5/458 363/37 |
| 2015/0333654 A1* | 11/2015 | Song | H02M 7/49 363/89 |
| 2015/0357905 A1 | 12/2015 | Nami et al. | |
| 2016/0141949 A1* | 5/2016 | Zhang | H02M 7/487 363/78 |
| 2016/0141963 A1* | 5/2016 | Bakran | H02M 3/33507 363/21.01 |
| 2016/0149508 A1* | 5/2016 | Choi | H02J 3/36 363/35 |
| 2017/0307688 A1* | 10/2017 | Trainer | G01R 31/3336 |
| 2017/0331390 A1* | 11/2017 | Xu | H02M 5/4585 |
| 2018/0183231 A1* | 6/2018 | Xie | H02H 7/1203 |
| 2019/0097411 A1* | 3/2019 | Cao | H01H 83/20 |

FOREIGN PATENT DOCUMENTS

| | | |
|---|---|---|
| WO | WO 2014127829 A1 | 8/2014 |
| WO | 2015110185 A1 | 7/2015 |
| WO | WO 2017050345 A1 | 3/2017 |

* cited by examiner

CONVERTER ASSEMBLY WITH AN ABILITY TO DISCONNECT A FAULT CURRENT AND A METHOD FOR DISCONNECTING A FAULT CURRENT AT A CONVERTER ASSEMBLY OF THIS TYPE

Converter assembly with an ability to disconnect a fault current and a method for disconnecting a fault current at a converter assembly of this type

BACKGROUND OF THE INVENTION

Field of the Invention

The invention relates to a converter assembly with an ability to disconnect a fault current as claimed in the independent converter assembly claim and an associated method as claimed in the independent method claim.

Modular multi-stage converters (MMC) are known from high-voltage direct-current transmission. They are fed on the input side from an alternating current network and provide a direct voltage for electrical energy supply in the high-voltage range on the output side. Connection is made through transformers that are connected on the secondary side to parallel-connected two-pole phase modules. The parallel-connected phase modules are each formed of two converter modules and connected to one another at a connection point. Each connection point forms a connection for one of the secondary-side phases of a transformer. The two converter modules are themselves in turn formed of series-connected sub-modules that comprise semiconductor switches that are implemented as a full-bridge circuit or a half-bridge circuit. These are also known in this connection as full-bridge and half-bridge modules (full-bridge and half-bridge sub-modules).

Converters with half-bridge modules are characterized by a high flexibility and efficiency. Due to the rectifier effect of the sub-modules, these converters cannot develop an appropriate opposing voltage in the event of short circuits on the direct voltage side, and must be disconnected from the alternating voltage network to disconnect the DC short circuit.

Due to their bipolar nature, converters with full-bridge modules can also provide direct voltages smaller than the chained alternating voltages, and can thus actively disconnect short circuits on the direct voltage side through the generation of an appropriate opposing voltage. They continue to make services such as, for example, reactive power (reactive current support) to the alternating current network after the disconnection. Due to the larger number of semiconductor switches in the current path, however, significantly higher electrical losses arise.

Summary of the Invention

The object of the invention is to achieve a converter assembly that actively disconnects fault currents on the direct current side, in particular short-circuit currents, within a short time, and which exhibits relatively low electrical losses. The object of the invention is, further, to propose a corresponding method for disconnecting a fault current in a corresponding converter assembly.

The object is achieved in terms of the converter through the features of the independent converter claim, and in terms of the method through the features of the independent method claim; the subsidiary claims present advantageous embodiments.

The solution relates to a converter assembly of multi-phase multi-stage converters that are connected to alternating current networks via primary-side parallel-connected transformers and which provide a total direct voltage (at two direct voltage output connections) for electrical energy supply in the high-voltage range, wherein the converter assembly comprises series-connected partial converters whose partial direct voltages form the total direct voltage (of the total converter) and each of which comprises three parallel-connected (mutually interconnected) two-pole phase modules, wherein each phase module is formed of two series-connected converter modules which are respectively connected to one another at a first connection point that forms one of the phase connections, wherein in each case one transformer is connected to the phase connections of a partial converter, wherein the two converter modules of the phase modules of a first partial converter are formed of series-connected unipolar sub-modules and those of a second partial converter are formed of series-connected bipolar sub-modules and the first and second partial converters are connected to one another at a second connection point, wherein a regulator for adjusting the direct current (that flows through the partial converters) to a predefined target value is provided which each reduce at least the partial direct voltage of the second partial converter when the direct current exceeds the target value, and wherein the partial direct voltage of the second partial converter can be inverted by the regulator at least until compensation of the partial direct voltage of the first partial converter.

The solution of the method for disconnecting a direct current fault current relates to a converter assembly (multi-phase multi-stage converter), wherein alternating current networks are connected to these via primary-side parallel-connected transformers, wherein these provide a total direct voltage (at two direct voltage output connections) for electrical energy supply in the high-voltage range, wherein these comprise series-connected partial converters from whose partial direct voltages the total direct voltage (of the total converter) is formed, wherein the partial converters each comprise parallel-connected (mutually interconnected) two-pole phase modules, wherein each phase module is formed of two series-connected converter modules that are each connected to one another at a first connection point which forms one of the phase connections, wherein respectively one transformer is connected to the phase connections of a partial converter, wherein the two converter modules of the phase modules PM of a first partial converter are formed of series-connected unipolar sub-modules and those of a second partial converter are formed of series-connected bipolar sub-modules, and the first and second partial converters are connected to one another at a second connection point, wherein, in the method, the direct current (that flows through the partial converters) is regulated to a predetermined target value in that respectively at least the partial direct voltage of the second partial converter is reduced when the direct current exceeds the target value, and wherein at least the partial direct voltage of the first partial converter is compensated by the partial direct voltage of the second partial converter (to reduce the direct current), in that an appropriate opposing voltage is generated by the second partial converter.

It is technically relatively simple if the unipolar sub-modules comprise semiconductor switches that are connected as half bridges (HB).

It is technically relatively simple if the bipolar sub-modules comprise semiconductor switches that are connected as full bridges (VB).

The semiconductors of the semiconductor switches of the individual partial converters advantageously belong to different voltage classes in order to adjust the current-carrying capacity of the partial converters to one another.

It is advantageous if the semiconductor switches of the partial converters are implemented in a parallel circuit in order to adjust the current-carrying capacity of the two partial converters to one another.

The solution thus consists of a series connection of in each case two partial converters connected directly in series and interacting, wherein one of the two partial converters is formed only of bipolar sub-modules and the other partial converter only of unipolar sub-modules. The direct voltage of the converter assembly consists of the sum of the direct voltages of the two partial converters. The partial converter with the bipolar sub-modules is here dimensioned such that its direct voltage is greater than (or at least, however, equally as great as) that of the partial converter with the unipolar sub-modules. In the event of a fault current on the direct voltage side, in particular a short-circuit, the direct voltage of the partial converter with the bipolar sub-modules is inverted within a very short time by the converter regulator, so that in total a direct voltage oriented against the direct fault current (short-circuit current) arises that actively disconnects the direct fault current (short-circuit current) through voltage compensation. Both partial converters can remain active here and continue to make, for example, reactive power and the like available to the alternating current network, meaning that the other functionality is retained.

In addition, in comparison to converter assemblies with only bipolar sub-modules for the full direct voltage, the blocking voltage required is approximately halved, which is particularly advantageous for cable applications (XLPE, limited polarity inversion strength). In addition, the proposed converter assembly increases availability since, for example, in the event of failure of one partial converter, the converter assembly can continue to be operated with reduced direct voltage.

The invention is described more closely below with reference to an exemplary embodiment.

DESCRIPTION OF THE INVENTION

Figure 1:
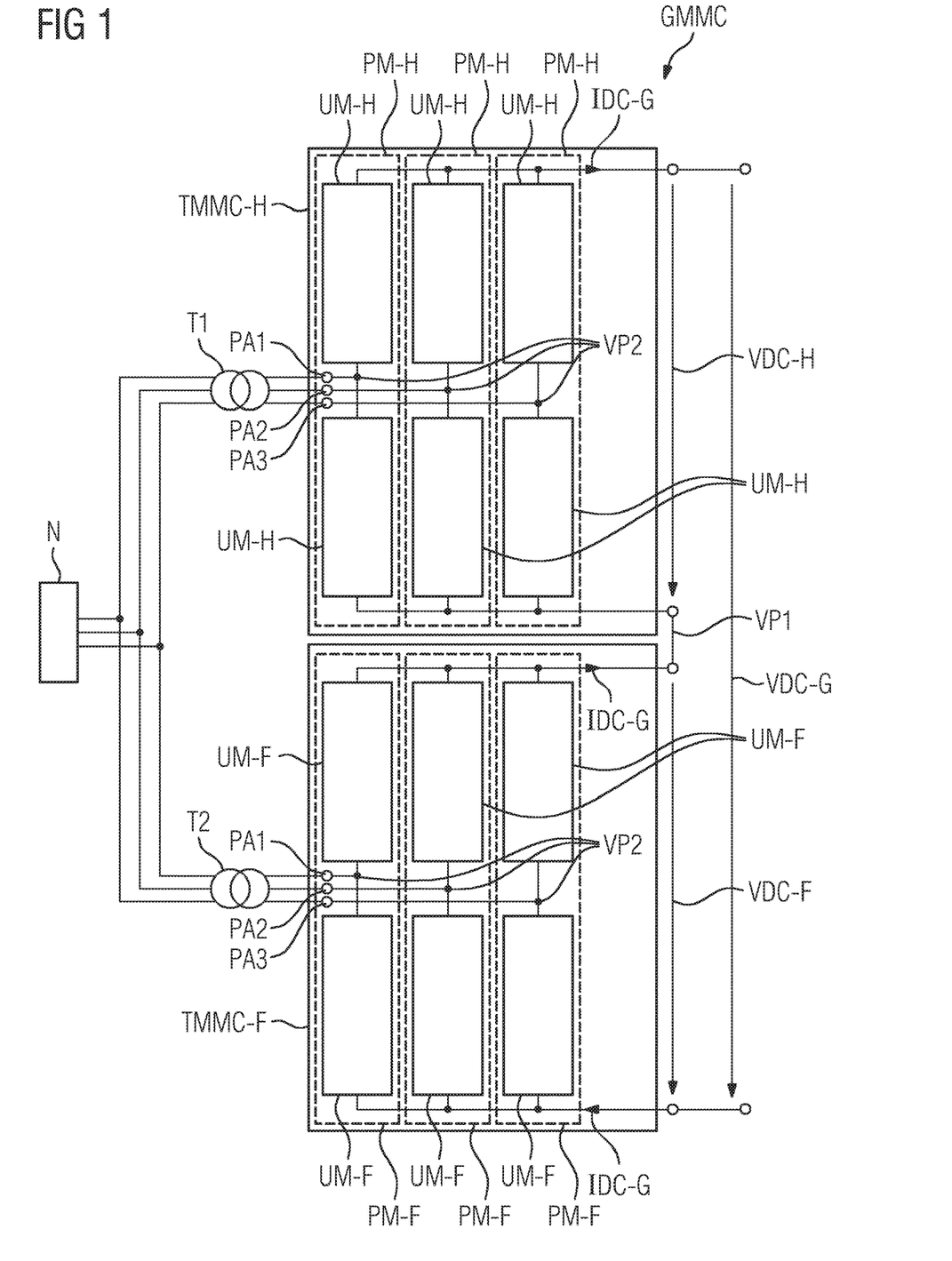
FIG. 1 shows a total converter designed as a multi-phase multi-stage converter comprising two partial converters.

FIG. 1 shows a converter assembly GMMC, that is designed as a multi-phase multi-stage total converter. A three-phase alternating current network N is connected to the converter assembly GMMC through two transformers T1, T2. The primary windings of the two transformers T1, T2 are connected in parallel, and the secondary windings of a transformer T1, T2 are each connected to phase connections PA1, PA2, PA3 of a partial converter TMMC-H, TMMC-F, which are both series-connected and connected to one another at a (first) connection point VP1, (and thereby almost form a total converter). The two partial converters TMMC-H, TMMC-F each provide a partial direct voltage VDC-H, VDC-F at their output. As a result of the series connection, the two partial direct voltages VDC-H, VDC-F form a total direct voltage VDC-G with a total direct current IDC-G which flows through the two partial converters TMMC-H, TMMC-F.

Both partial converters TMMC-H, TMMC-F are each formed of three parallel-connected phase modules PM-H, PM-F. The two poles of the two-pole phase modules PM-H, PM-F are connected to one another in a parallel circuit. Each phase module PM-H, PM-F consists in turn of two series-connected converter modules UM-H, UM-F which are respectively connected to one another at a second connection point VP2. Each connection point VP2 forms one of the phase connections PA1, PA2, PA3.

Figure 2:
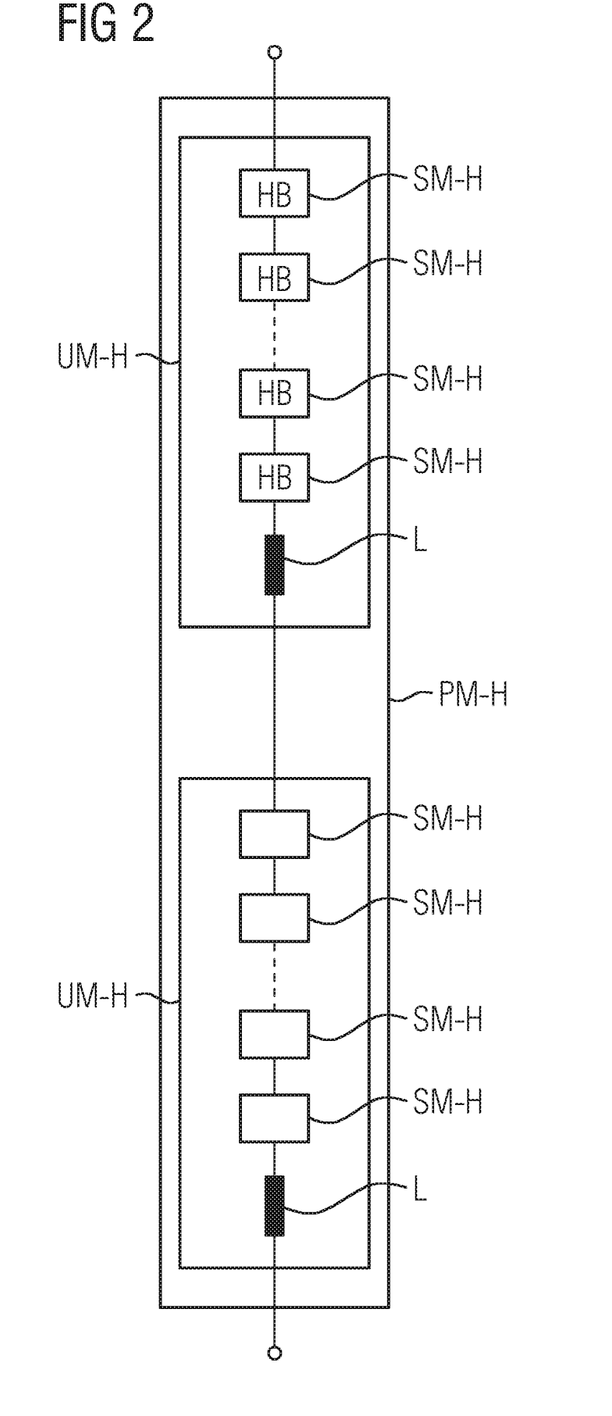
FIG. 2 shows a phase module of the one partial converter with sub-modules in a half-bridge circuit.

FIG. 2 shows schematically a phase module PM-H of a partial converter TMMC-H that is formed of series-connected unipolar sub-modules SM-H and an inductance L. The unipolar sub-modules SM-H of the partial converter TMMC-H consist here in particular of semiconductor switches that are connected as half bridges HB (see FIG. 4).

Figure 3:
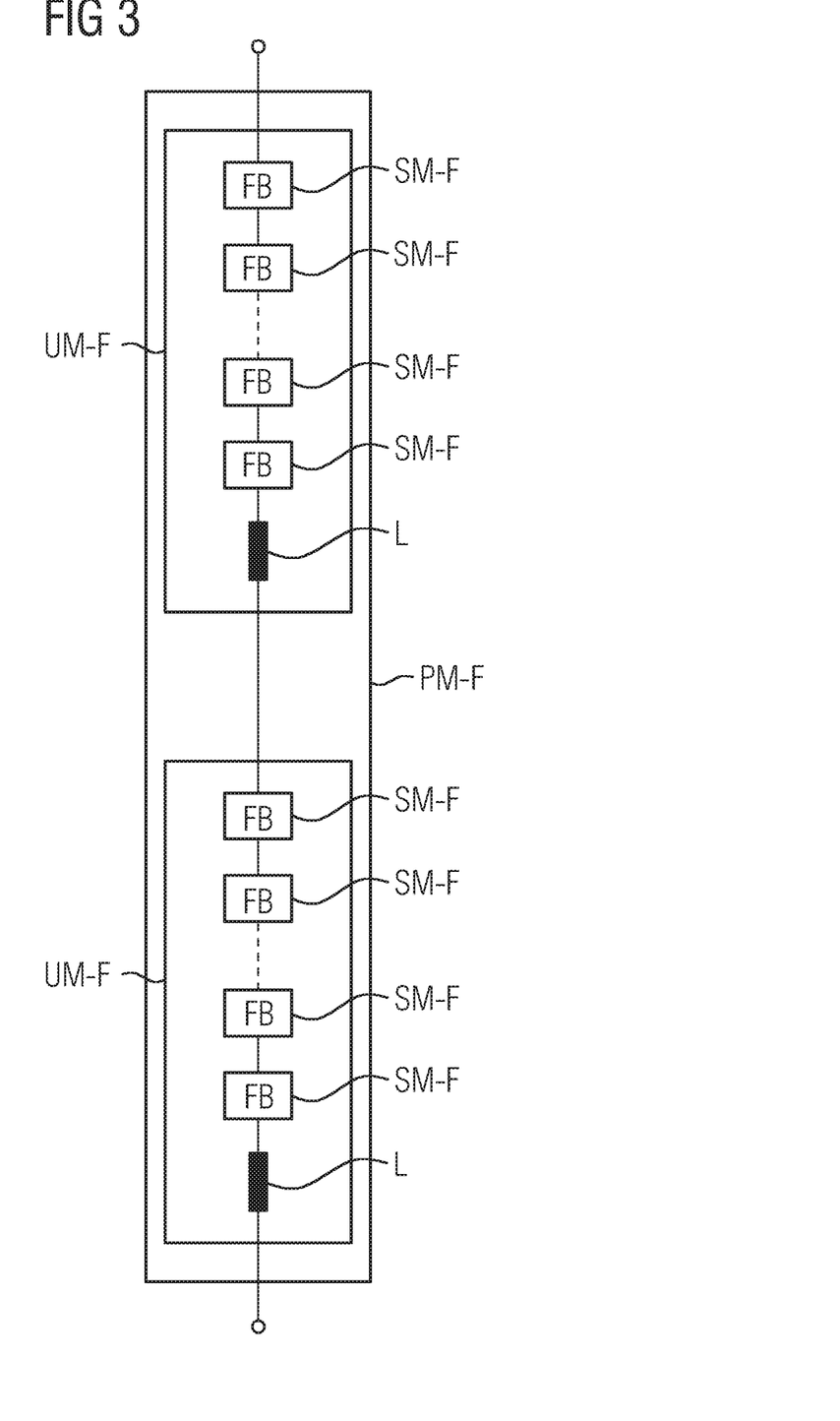
FIG. 3 shows a phase module of the other partial converter with sub-modules in a full-bridge circuit.

A phase module PM-F of a partial converter TMMC-F that consists of series-connected bipolar sub-modules SM-H and an inductance L is shown in FIG. 3. The bipolar sub-modules SM-F are implemented here in particular with semiconductor switches in a full-bridge circuit FB (see FIG. 5).

Figure 4:
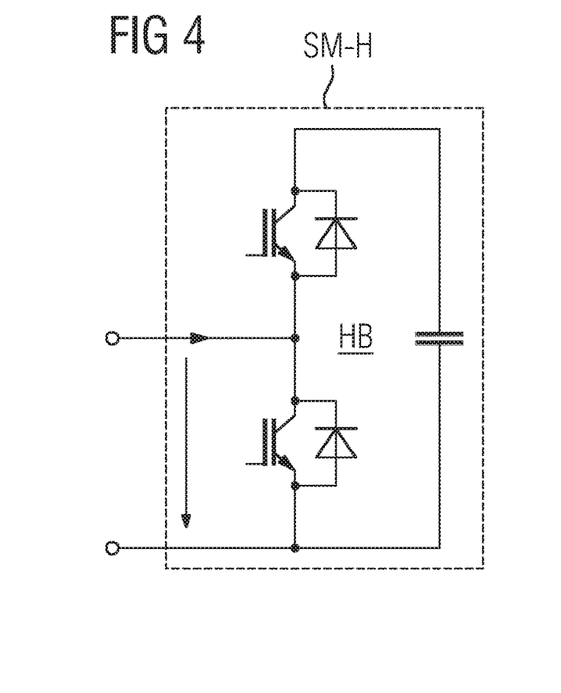
FIG. 4 shows a sub-module in a half-bridge circuit.
Figure 5:
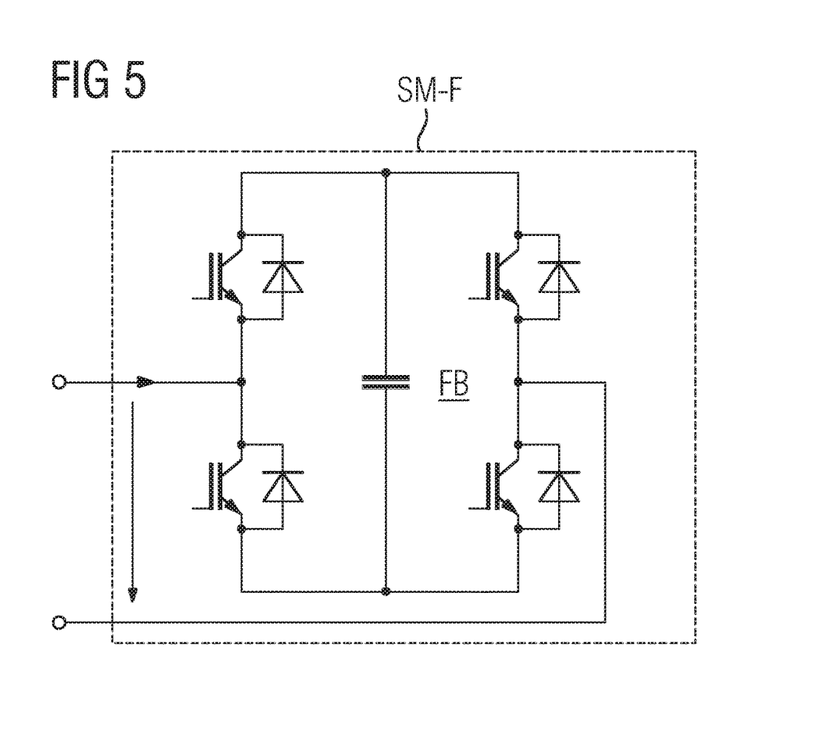
FIG. 5 shows a sub-module in a full-bridge circuit.

FIG. 4 and FIG. 5 show a unipolar sub-module SM-H with semiconductor switches in a half-bridge circuit and a bipolar sub-module SM-F with semiconductor switches in a full-bridge circuit.

Figure 6:
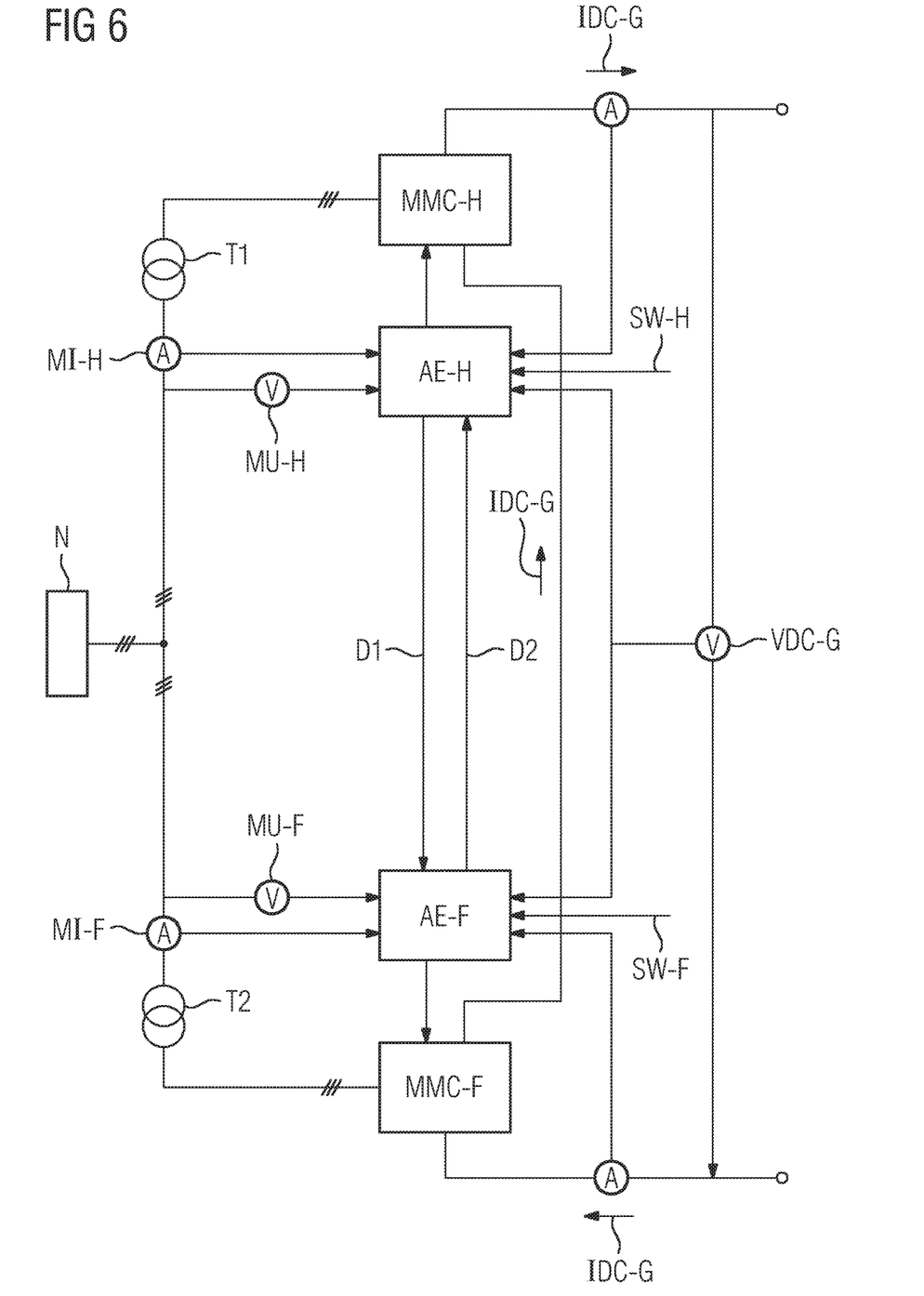
FIG. 6 shows the control of the total converter according to FIG. 1.

FIG. 6 shows the control of the converter assembly GMMC according to FIG. 1. Two drive units AE-H, AE-F, to which appropriate target values SW-H, SW-F are specified, are used for the regulation (automatic control) of the two partial converters TMMC-H, TMMC-F.

In each case a current measurement MI-H, MI-F and a voltage measurement MU-H, MU-F are carried out upstream of the transformers T1, T2, i.e. on the primary side, their values being supplied to the respective drive unit AE-H, AE-F. From these the drive units AE-H, AE-F determine the corresponding control signals S-H and S-F for the sub-modules SM-H, SM-F of the partial converters TMMC-H, TMMC-F. In addition, the direct current IDC-G flowing through the partial converters TMMC-H, TMMC-F and the direct output voltage VDC-G are supplied to the drive units AE-H, AE-F. The two drive units AE-H, AE-F exchange the data D1, D2 required for an appropriate regulation.

The regulation of the total converter GMMC by the two drive units AE-H, AE-F is performed in such a way that each drive unit AE-H, AE-F reduces the respective associated partial direct voltage VDC-H or VDC-F when the direct current IDC-G exceeds the predefined target value SW-H, SW-F.

Figure 7:
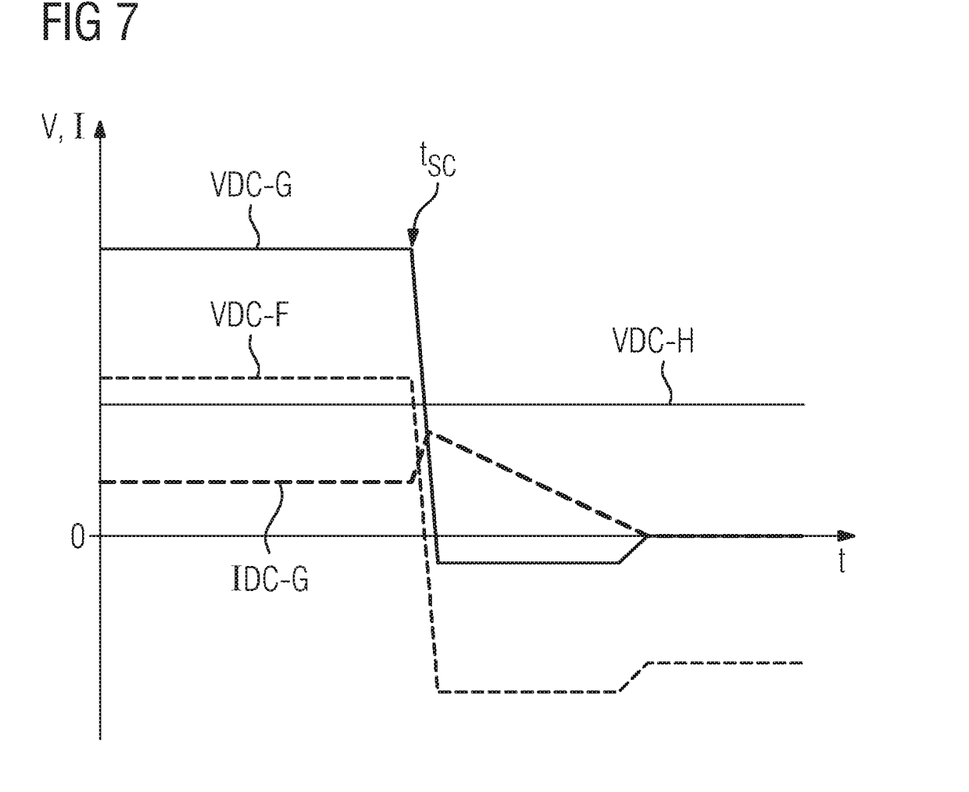
FIG. 7 shows the course of the direct voltages and of the direct current over time after an output-side short-circuit.

FIG. 7 shows schematically the course of the direct voltages and of the direct current IDC-G over time t after a short-circuit tSC. In the event of a short circuit at the point in time tSC as a particular fault current on the direct voltage side (a direct current fault current), the direct current IDC-G is initially further exceeded in spite of the reduction of the partial direct voltages VDC-H, VDC-F of the partial converters TMMC-H, TMMC-F. The further exceeding of the direct current IDC-G after the short circuit tSC is illustrated schematically in FIG. 7.

It can be seen that the partial converter TMMC-F reduces its output voltage VDC-F to 0 within a very short time t, then inverts and then increases its magnitude again, i.e. generates an increasing voltage VDC-F with the inverted arithmetic sign. The voltage VDC-F with the inverted arithmetic sign grows in magnitude until the direct voltage VDC-H of the partial converter TMMC-H is at least compensated. The partial converter TMMC-F is designed here such that the partial direct voltage VDC-H is over-compensated, i.e. that a small overcompensation takes place. The current IDC-G increases a little after the short-circuit tSC until the corresponding reduction in the direct voltage VDC-F occurs. The specified direct current IDC-G is somewhat increased in the case of a short circuit, and then, as a result of the compensation of the direct voltage VDC-H that occurs, is initially heavily "over-reduced", and then disconnected.

Figure 8:
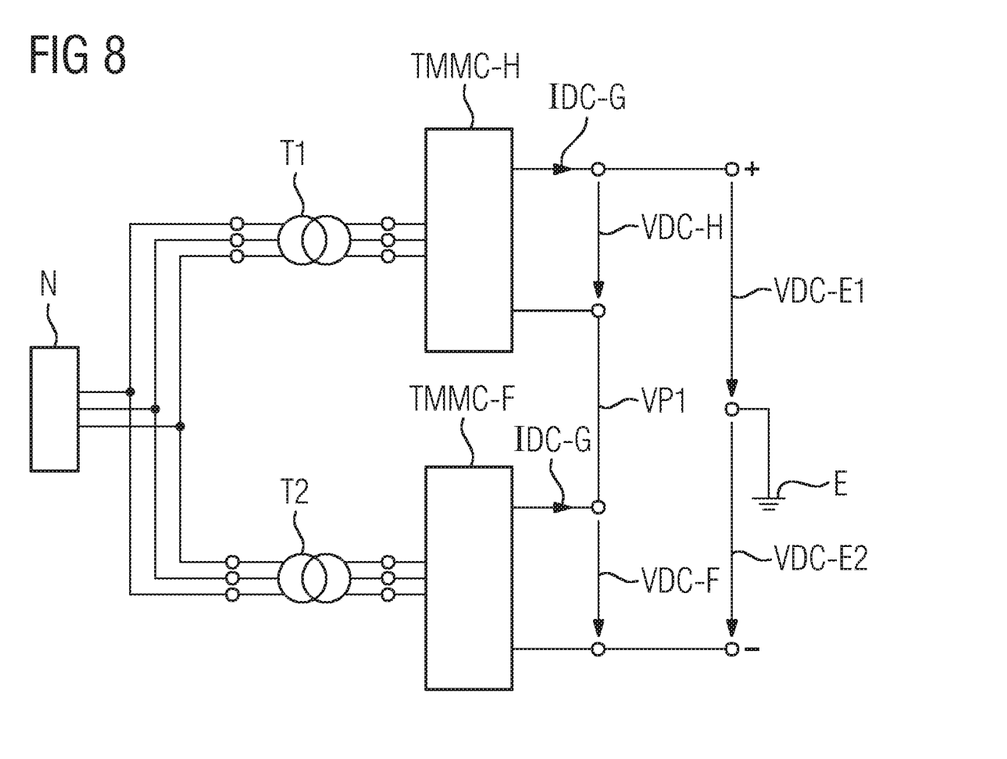
FIG. 8 shows two partial converters connected as an asymmetric-symmetric monopole.

FIG. 8 shows a converter assembly GMMC with two partial converters TMMC-H, TMMC-F, implemented as a symmetric monopole with a symmetric ground E.

Figure 9:
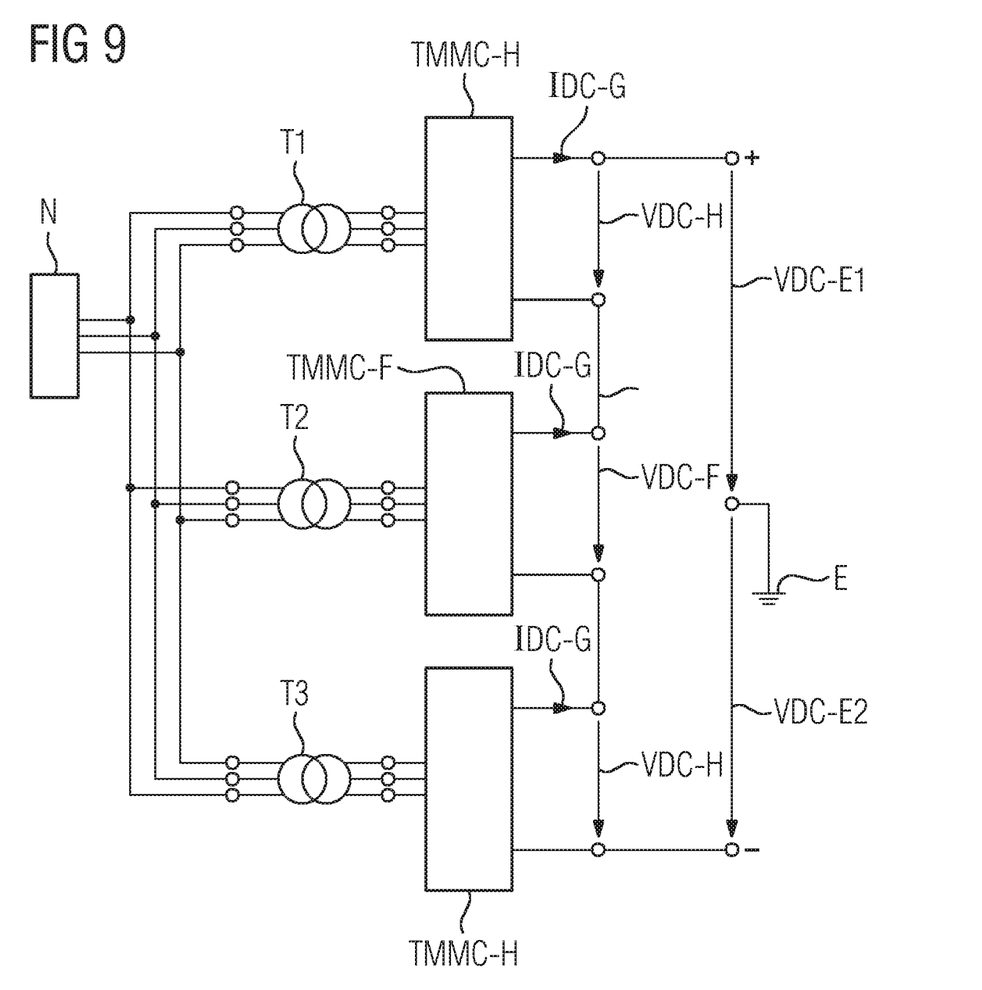
FIG. 9 shows three partial converters connected as a symmetric monopole.

FIG. 9 shows a converter assembly GMMC with three partial converters TMMC-H, TMMC-F, implemented as a symmetric monopole with a symmetric ground E. In the event of a fault current (a short circuit) the partial converter TMMC-F compensates here the partial direct voltages VDC-H of the associated partial converter TMMC-H.

Figure 10:
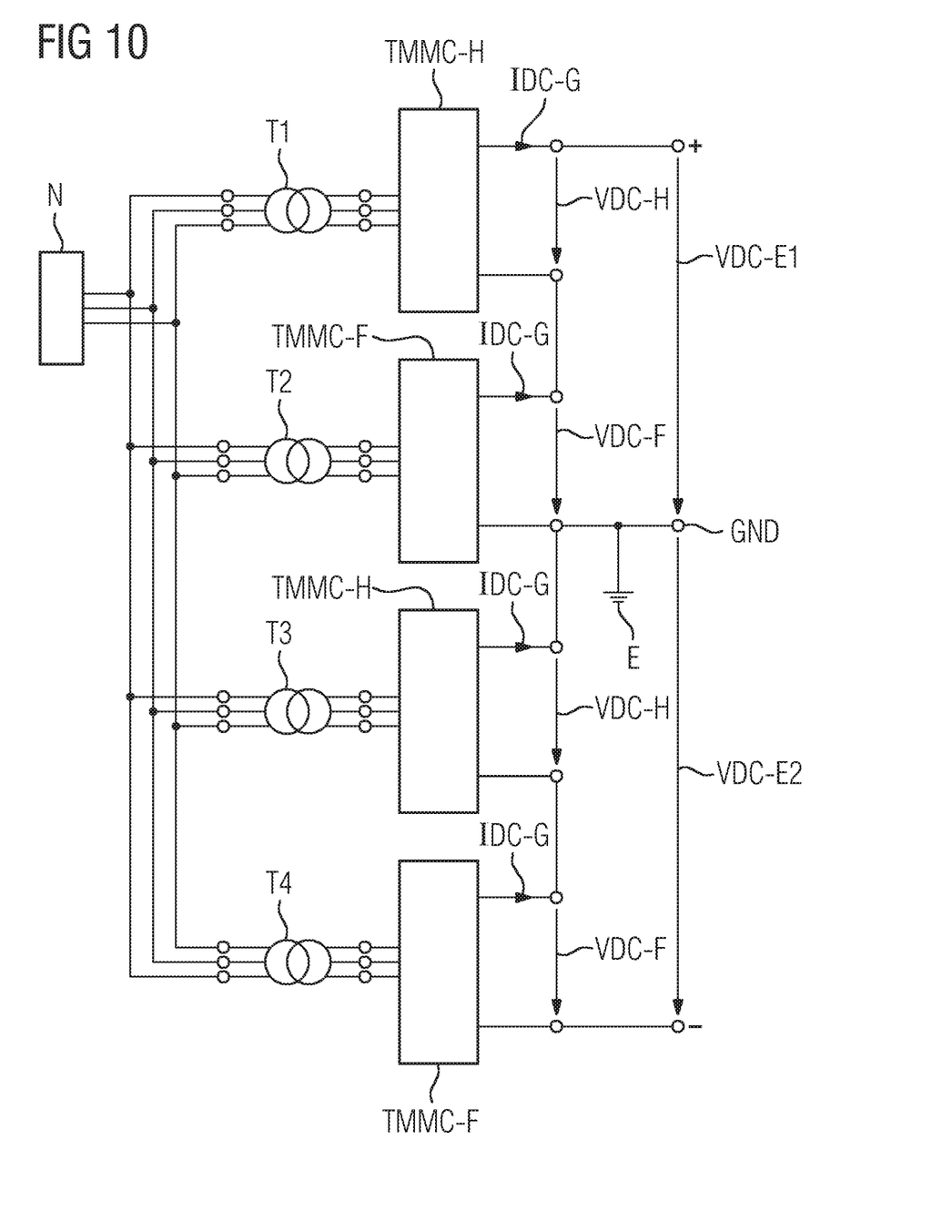
FIG. 10 shows three partial converters connected as a symmetric bipole.

FIG. 10 shows a converter assembly GMMC with four partial converters TMMC-H, TMMC-F, implemented as bipoles with a ground E. In the event of a fault current (a short circuit), the partial converter TMMC-F compensates here the partial direct voltages VDC-H of the associated partial converter TMMC-H, that is, counted from top to bottom with reference to FIG. 10: the second partial converter TMMC-F compensates the partial direct voltage VDC-H of the first partial converter TMMC-H, and the fourth partial converter TMMC-F compensates the partial direct voltage VDC-H of the third partial converter TMMC-H.

The invention claimed is:

1. A converter assembly for connecting to an alternating current network via primary-side, parallel-connected transformers, wherein the converter assembly providing a total direct voltage for an electrical energy supply in a high-voltage range, the converter assembly comprising:
a first connection point;
a plurality of phase connections;
series-connected partial converters whose partial direct voltages form the total direct voltage, said series-connected partial converters each having three parallel-connected two-pole phase modules, wherein each of said parallel-connected two-pole phase modules having two series-connected converter modules that are each connected to one another at a second connection point which each forms one of said plurality of phase connections, wherein one of the transformers has a secondary winding connected to said phase connections of one of said partial converters, and wherein another one of the transformers has a secondary winding connected to said phase connections of another one of said partial converters;
said two series-connected converter modules of said parallel-connected two-pole phase modules of a first partial converter of said series-connected partial converters being formed of series-connected unipolar sub-modules;
said two series-connected converter modules of said parallel-connected two-pole phase modules of a second partial converter of said series-connected partial converters formed of series-connected bipolar sub-modules, said first and second partial converters are connected to one another at said first connection point; and
a regulator for adjusting a direct current to a predefined target value which reduce at least a partial direct voltage of said second partial converter when the direct current exceeds the predefined target value, wherein the partial direct voltage of said second partial converter can be inverted by said regulator at least until compensation of the partial direct voltage of said first partial converter.

2. The converter assembly according to claim 1, wherein said unipolar sub-modules of said first partial converter contain semiconductor switches that are connected as half bridges.

3. The converter assembly according to claim 2, wherein said bipolar sub-modules of said second partial converter contain semiconductor switches that are connected as full bridges.

4. The converter assembly according to claim 3, wherein said semiconductor switches of said unipolar sub-modules and said semiconductor switches of said bipolar sub-modules have semiconductors belonging to different voltage classes in order to adjust a current-carrying capacity of said first and second partial converters to one another.

5. The converter assembly according to claim 4, wherein said semiconductor switches of said unipolar sub-modules are implemented in a parallel circuit in order to adjust the current-carrying capacity of said two partial converters to one another.

6. The converter assembly according to claim 1, wherein the one of the transformers has a primary winding configured to be connected externally from the converter assembly and the other one of the transformers has a primary winding configured to be connected externally from the converter assembly.

7. A method for disconnecting a direct current fault current at a converter assembly connected to a three-phase alternating current network via primary-side, parallel-connected transformers, wherein the converter assembly providing a total direct voltage at two direct voltage output connections for electrical energy supply in a high-voltage range, wherein the converter assembly is formed of a first connection point, second connection points and series-connected partial converters whose partial direct voltages form the total direct voltage, and each of the partial converters contain three parallel-connected two-pole phase modules, which comprises the steps of:

forming each of the parallel-connected two-pole phase modules with two series-connected converter modules, which are each respectively connected to one another at the second connection points and that each second connection point forms one of a plurality of phase connections, wherein one of the transformers has secondary winding connected to the phase connections of one of the partial converters, and wherein another one of the transformers has a secondary winding connected to the phase connections of another one of the partial converters;

forming the two series-connected converter modules of the parallel-connected two-pole phase modules of a first partial converter of the series-connected partial converters of series-connected unipolar sub-modules; and forming the two converter modules of the parallel-connected two-pole phase modules of a second partial converter of the series-connected partial converters of series-connected bipolar sub-modules, and the first and the second partial converters are connected to one another at the first connection point; and providing a regulator for regulating a direct current to a predetermined target value in that respectively at least a partial direct voltage of the second partial converter is reduced when the direct current exceeds the predetermined target value, wherein a partial direct voltage of the first partial converter is compensated by a partial direct voltage of the second partial converter, in that an appropriate opposing voltage is generated by the second partial converter.

8. The method according to claim 7, wherein the one of the transformers has a primary winding configured to be connected externally from the converter assembly and the other one of the transformers has a primary winding configured to be connected externally from the converter assembly.

* * * * *